(12) United States Patent
Hess et al.

(10) Patent No.: US 6,367,338 B1
(45) Date of Patent: Apr. 9, 2002

(54) FORCE-MEASURING APPARATUS, PARTICULARLY A WEIGHING CELL II

(75) Inventors: Luzi Hess, Zurich; Hans-Rudolf Burkhard, Wila; Stephan Baltisberger, Uster, all of (CH); Hans de Waal, Newfoundland, NJ (US); Daniel Reber, Russikon (CH)

(73) Assignee: Mettler-Toledo GmbH, Greifensee (CH)

( * ) Notice: Subject to any disclaimer, the term of this patent is extended or adjusted under 35 U.S.C. 154(b) by 0 days.

(21) Appl. No.: 09/469,387

(22) Filed: Dec. 22, 1999

(30) Foreign Application Priority Data

Dec. 23, 1998 (DE) .......................................... 198 59 991

(51) Int. Cl.[7] ............................................. G01L 1/300
(52) U.S. Cl. .................................................. 73/862.381
(58) Field of Search ...................... 78/862.381, 862.382; 177/211–229

(56) References Cited

U.S. PATENT DOCUMENTS 3,465,838 A * 9/1969 Kienzle et al. ............. 177/256
3,894,593 A * 7/1975 Hall et al. .................. 177/164
3,924,443 A * 12/1975 Herbert ........................ 73/1 B
4,429,756 A * 2/1984 Jabobson et al. ........... 177/211
4,817,428 A * 4/1989 Ford et al. .................... 73/434
5,340,951 A * 8/1994 Hungerbuhler et al. ..... 177/229

FOREIGN PATENT DOCUMENTS

DE 9206286 11/1992
DE 4204480 5/1998

* cited by examiner

Primary Examiner—Benjamin R. Fuller
Assistant Examiner—Jewel V. Thompson
(74) Attorney, Agent, or Firm—Friedrich Kueffner

(57) ABSTRACT

A force-measuring apparatus, particularly a weighing cell, has a stationary part 10, a load receiver 60, a measuring transducer 138, and a lever 100 for transmitting a force from the load receiver to the measuring transducer. An improved arrangement is proposed for changing the lever ratio by providing at least two different locations so that the fulcrum pivot flexures can be attached either at positions 112/212 and 118/318 or, alternatively, at positions 114/214 and 116/316 of the lever/stationary part.

29 Claims, 4 Drawing Sheets

FORCE-MEASURING APPARATUS, PARTICULARLY A WEIGHING CELL II

BACKGROUND OF THE INVENTION

The present invention relates to a force-measuring apparatus, particularly a weighing cell, with a stationary part and a load receiver that serves to receive the force to be measured. The load receiver is coupled to the stationary part so that, in response to the force, the load receiver is movable in relation to the stationary part. The force-measuring apparatus includes a lever that is connected to the load receiver through a first connector element and to the stationary part through a second connector element. The first and second connector elements are located at a distance from each other in the lengthwise direction of the lever and are part of an arrangement that allows the lever ratio to be changed. The second connector element forms the fulcrum axis for the rotation of the lever as the latter transmits the displacement of the load receiver to a lever output area located at a distance from the first and second connector elements in the lengthwise direction of the lever.

Force-measuring apparatus of this kind are described, e.g., in the Swiss patent CH 591 684 and incorporate the concept that, in many cases, a base model type of a weighing cell is followed by one or more derivative models that differ from the base model in regard to the weighing range or the measuring resolution. According to the aforementioned patent, the number of components required to manufacture weighing cells of this kind can be reduced by changing the arm ratio of the lever that serves to transmit the displacement motion of the load receiver to a compensation coil immersed in the gap of a permanent magnet assembly that is attached to the stationary part. As proposed in that patent, this can be accomplished by connecting a one-armed lever to the stationary part through two tensile flexures so that the lever is rotatable about a fulcrum axis formed by the tensile flexures in an arrangement where the lever arm length between the fulcrum axis and an attachment area for connecting the lever to the load receiver can be changed by means of spacer blocks. The spacer blocks can be arranged on the one hand between the lever and the tensile flexures and on the other hand between the stationary part and the tensile flexures. It is further proposed in the aforementioned patent that appropriate spacer blocks be inserted also at the respective attachment areas of the load receiver and/or the lever where a tensile flexible coupling element is attached that connects the load receiver with the lever. A similar weighing cell, in which the concept of changing lever ratios with spacer blocks is applied to a two-armed lever, is described in the Swiss patent 591 685.

The weighing range of these known load cells can be selected from at least two possible values by changing the position of the spacer blocks and thereby changing the lever ratio between the displacement of the load receiver and the displacement of the compensation coil.

However, with the known weighing cells, it has been found that changing the positions of the spacer blocks in order to change the weighing range is generally a time-consuming process and can also be harmful to the measuring accuracy.

SUMMARY OF THE INVENTION

In view of the aforementioned problems inherent in state-of-the-art devices, it is therefore the object of the present invention to provide a force-measuring apparatus that allows the measuring range to be changed quickly and reliably.

According to the invention, this goal is accomplished through a design advancement of the known force-measuring apparatus. The essential characteristic feature of the inventive design is that the lever has at least three attachment areas for fastening one of the first and second connector elements, and that the attachment areas are set apart at a distance from each other in the lengthwise direction of the lever.

The invention is based on the observation that the problems with the state-of-the-art solutions mentioned above are essentially caused by the way the spacer blocks are handled for changing the measuring range. Namely, in a first step, the tensile and pivotal flexures have to be disconnected from the lever, the load receiver, and the stationary part. Next, the spacer blocks are removed from their original positions and arranged in their new positions. In a final step, in which the tensile and pivotal flexures are reattached, the spacer blocks have to be kept precisely fixed in their new positions. This complicates the handling of the tensile and pivotal flexures in the assembly process because of the additional time required to change the measuring range. In addition, it is possible for the spacer blocks to be dislodged from their intended new positions, which is detrimental to the measuring accuracy.

The force-measuring apparatus with the inventive design advancements is free of the problems associated with the handling of the spacer blocks, because the lever itself has at least three attachment areas for fastening a connector element, which are set apart at a distance from each other in the lengthwise direction of the lever. In each measuring range, only two of the attachment areas are used, so that the measuring range can be set or changed by simply selecting or changing the attachment areas used for fastening the connector elements without the need for the time-consuming and error-prone process of handling spacer blocks. As a result, the time required to change measuring ranges is shortened, while at the same time the functional reliability of the force-measuring apparatus is increased.

In addition, from a manufacturing point of view, the force-measuring apparatus according to the invention has the advantage that one and the same lever component can be used to manufacture balances with different weighing ranges by fastening the connector elements to different respective attachment areas. This manufacturing advantage is also particularly useful even in the case where no change in measuring range has to be made during the actual operation of the force-measuring apparatus.

The process of changing measuring ranges of a force-measuring apparatus in accordance with the invention can be further simplified through an arrangement where at least two attachment areas are set apart at a distance from each other in the transverse direction of the lever, because this allows a connector element to be fastened to one of the attachment areas without spatial interference by a connector element already fastened to the other attachment area.

The fulcrum axis formed by the second connector element can be defined with particular accuracy while, at the same time, the lever is stabilized against tilting in relation to its longitudinal axis, if at least one of the attachment areas for the second connector element has at least two attachment area segments at a distance from each other along the fulcrum axis. In this arrangement, the second connector element can be, for example, a pair of tensile pivotal flexures.

The process of changing measuring ranges of a force-measuring apparatus in accordance with the invention can be further simplified through an arrangement where at least one attachment area comprises an attachment surface approximately perpendicular to the longitudinal axis of the lever and located at a frontal end surface of the lever at the opposite end from the lever output area, because this arrangement allows a connector element to be fastened to the attachment surface without spatial interference by a measuring transducer, e.g., an electromagnetic force-compensation system, which is normally arranged at the output area of the lever. In particular, the inventive concept includes the possibility that the aforementioned attachment surface consists of a plurality of attachment surface segments set apart at a distance from each other in the direction of the fulcrum axis. The inventive concept further includes an embodiment where the attachment surface for the first connector element is arranged parallel to the fulcrum axis between two attachment area segments for the second connector element.

The process of changing measuring ranges of a force-measuring apparatus in accordance with the invention can be further simplified through an arrangement where the load receiver and the stationary part in total have at least three coupling areas for fastening one of the connector elements. In the lengthwise direction of the lever, the coupling areas are spaced apart from each other at analogous positions to the attachment areas on the lever. With this arrangement of the coupling areas on the load receiver and the stationary part, it is possible to change measuring ranges without changing the position of the lever in relation to the load receiver and the stationary part, because for each of the attachment areas of the lever there is a corresponding coupling area available on the load receiver or the stationary part. Thus, the measuring range can be set without changing the position of the lever simply by selecting the attachment areas and their associated coupling areas to which the connector elements are to be fastened.

For the same reasons as given above for the preferred arrangement of the attachment areas, it is particularly advantageous if at least two coupling areas are set apart from each other in a direction parallel to the fulcrum axis of the lever and if at least one coupling area of the stationary part has at least two coupling area segments arranged side-by-side at a distance from each other along the fulcrum axis. This also allows the coupling areas to have coupling surfaces perpendicular to the lengthwise direction of the lever and facing in the opposite direction from the output area of the lever. This further makes it possible to use simple connector elements comprising one or more pivotal flexures, provided that the coupling areas are coplanar with the respective associated attachment areas.

Particularly with the immediately preceding embodiment of the invention, it is possible to set different measuring ranges with only two connector elements, each of which can comprise one or more pivotal flexures, if the coupling areas and their associated attachment areas are located at appropriately corresponding positions and designed so that one connector element can be used in more than one position.

The process of changing measuring ranges of a force-measuring apparatus in accordance with the invention can be further simplified through an arrangement where at least one of the attachment areas and/or coupling areas is designed for fastening a connector element with one or more screws, particularly by providing at least one threaded hole.

In a particularly advantageous configuration of the inventive apparatus, the attachment and/or coupling areas are about mirror-symmetric in relation to a central plane that is perpendicular to the fulcrum axis, because a particularly high degree of measuring accuracy is achievable with this arrangement. As a part of this configuration, it is practical if at least one attachment for the first connector element and/or a coupling area of the load receiver is arranged parallel to the fulcrum axis between two attachment area segments for the second connector element and/or two coupling area segments of the stationary part.

A force-measuring apparatus according to the invention can be given a particularly compact design envelope if, in the lengthwise direction of the lever, the load receiver is arranged between the attachment areas and the lever output area, preferably in an opening of the lever. To provide a coupling area for a first connector element so that the coupling area is coplanar with the associated attachment area at the frontal end surface of the lever, the load receiver is preferably equipped with a cantilevered portion carrying the coupling area for the first connector element.

To achieve the most compact configuration possible in a force-measuring apparatus according to the invention, it has proven to be especially advantageous if the stationary part comprises two lateral parts extending in planes essentially perpendicular to the fulcrum axis and if the lever is arranged essentially between the two lateral parts. In addition to a particularly compact configuration, this arrangement also protects the lever from being dislodged accidentally by a force from the side. In the preceding embodiment of the invention, the mirror-symmetric arrangement of the coupling area segments of the stationary part can be realized in a particularly simple manner if each of the lateral parts comprises at least one segment of a coupling area. To avoid spatial interference between the coupling elements and the measuring transducer that is normally arranged at the lever output area, it is practical for the coupling area segments to be arranged at the ends of the lateral parts on the opposite side from the lever output area. With this arrangement it can be achieved that, in a load-free condition of the system, the connection between the lever and the stationary part is subjected to only tensile forces, if the lever has at least one projection extending about parallel to the fulcrum axis in the direction towards one of the lateral parts with at least one attachment area segment and if the attachment area segment of the projection lies in the same plane, perpendicular to the lengthwise direction of the lever, as the associated coupling area segment of the respective lateral part.

As has already been explained, a practical arrangement for an attachment area of the lever for a first connector element is between the ends of the lateral parts. With this arrangement it can be achieved that, in a load-free condition of the system, the connection between the lever and the load receiver is subjected to only tensile forces, if a coupling area of the load receiver lies in the same plane, perpendicular to the lengthwise direction of the lever, as the associated attachment area of the lever.

To avoid measuring errors that could occur as a result of applying a load eccentrically to a weighing pan or load plate attached to the load receiver, a particularly preferred arrangement is for the load receiver to be guided in a mode of parallel motion in relation to the stationary part by two parallel guide members that are stiff in their longitudinal direction but allow flexible movement in the transverse direction. Each of the two parallel guide members is attached at one end to the load receiver and at the opposite end to the stationary part. This arrangement allows a particularly compact design of the inventive apparatus, if the lengthwise direction of the lever is approximately parallel to the guide members and the lever lies essentially between the parallel planes of the guide members. To ensure the absence of measuring errors caused by an eccentric load, it is necessary for the guide members to be exactly parallel to each other. As a practical means of ensuring the exact parallel alignment of the guide members, the inventive apparatus is equipped with an adjusting device by which the position of at least one attachment terminal where one of the guide members is mounted to the stationary part can be adjusted in the direction transverse to the plane of the guide member. In a particularly simple embodiment of this concept, the attachment terminal is connected to an arm that is about parallel to the guide members and is pivotally connected to the stationary part so that it can swivel up or down in relation to the latter. The position of the arm is secured or changed by a position-adjuster element holding the arm at an adjustment area.

In an advantageous embodiment of the invention, the distance from the adjustment area of the arm to the attachment terminal for the guide member is at least exactly as long as the distance from the attachment terminal to the pivotal connection of the arm. Thus, when the position of the arm is being changed by means of the position-adjuster element, the displacement of the adjustment area is leveraged down by a factor of more than two at the attachment terminal so that a precise position adjustment of the attachment terminal is possible even with only a simple adjustment screw as a position-adjuster element.

It is practical for the arm that makes up part of the adjustment device to be coupled to the stationary part through a pivotal flexure and, preferably, to be formed as an integral, monolithically connected portion of the stationary part. A particularly compact design version of the inventive force-measuring apparatus is made possible if the arm extends lengthwise from its pivotal connection in the direction towards the load-receiver ends of the guide members. An arm of this kind can be realized, e.g., with a slit in the respective lateral part. If the guide members are attached to both of the lateral parts, it has proven to be particularly advantageous if each of the lateral parts comprises an arm with an attachment terminal, each of the arms being adjustable by means of an adjuster element so that the attachment terminals of the two arms can be adjusted independently of each other.

In the interest of a particularly compact configuration, it is preferred if at least one arm of the adjustment device extends essentially in the space between the planes of the guide members in a parallel plane to the guide members.

An undesired torsional deformation of the arm in the area of the attachment terminal can be avoided without increasing the weight of the apparatus, if a section of the arm comprising the attachment terminal is thicker in the direction transverse to the planes of the guide members than a section of the arm comprising the adjustment area.

An undesirable sideways displacement of the arm in the direction parallel to its pivotal axis can be prevented, if the inventive force-measuring apparatus includes a stabilizer element that is connected at one end to the arm and at the other end to the body of the stationary part, so that it stiffens the arm against moving sideways in parallel with the planes of the guide members while allowing movement perpendicular to the planes of the guide members, preferably by being elastically flexible.

From the point of view of optimizing the construction, it has proven to be particularly advantageous if the stabilizer element is formed in a monolithic unit together with the arm and/or the body of the stationary part as an essentially S-shaped connector portion as seen in a plane that is perpendicular to the pivotal axis of the arm. An additional increase in the torsional rigidity of the arm is achieved if the width of the connector portion in the direction parallel to the pivotal axis of the arm is significantly greater than the thickness in the perpendicular direction.

To achieve the most compact configuration possible for the inventive force-measuring apparatus, it has proven to be particularly advantageous if, in relation to the lengthwise direction of the arm, the stabilizer element is arranged essentially at a location between the adjustment area and the attachment area. A further improvement in utilizing the remaining free space is achieved, if the stabilizer element is arranged essentially between the guide members, as seen in a sectional plane that is perpendicular to the pivotal axis.

In the following, the invention is explained on the basis of the drawing, which is also being explicitly referred to with regard to all details essential to the invention that are not closely portrayed in the description.

DETAILED DESCRIPTION OF THE INVENTION

Figure 1:
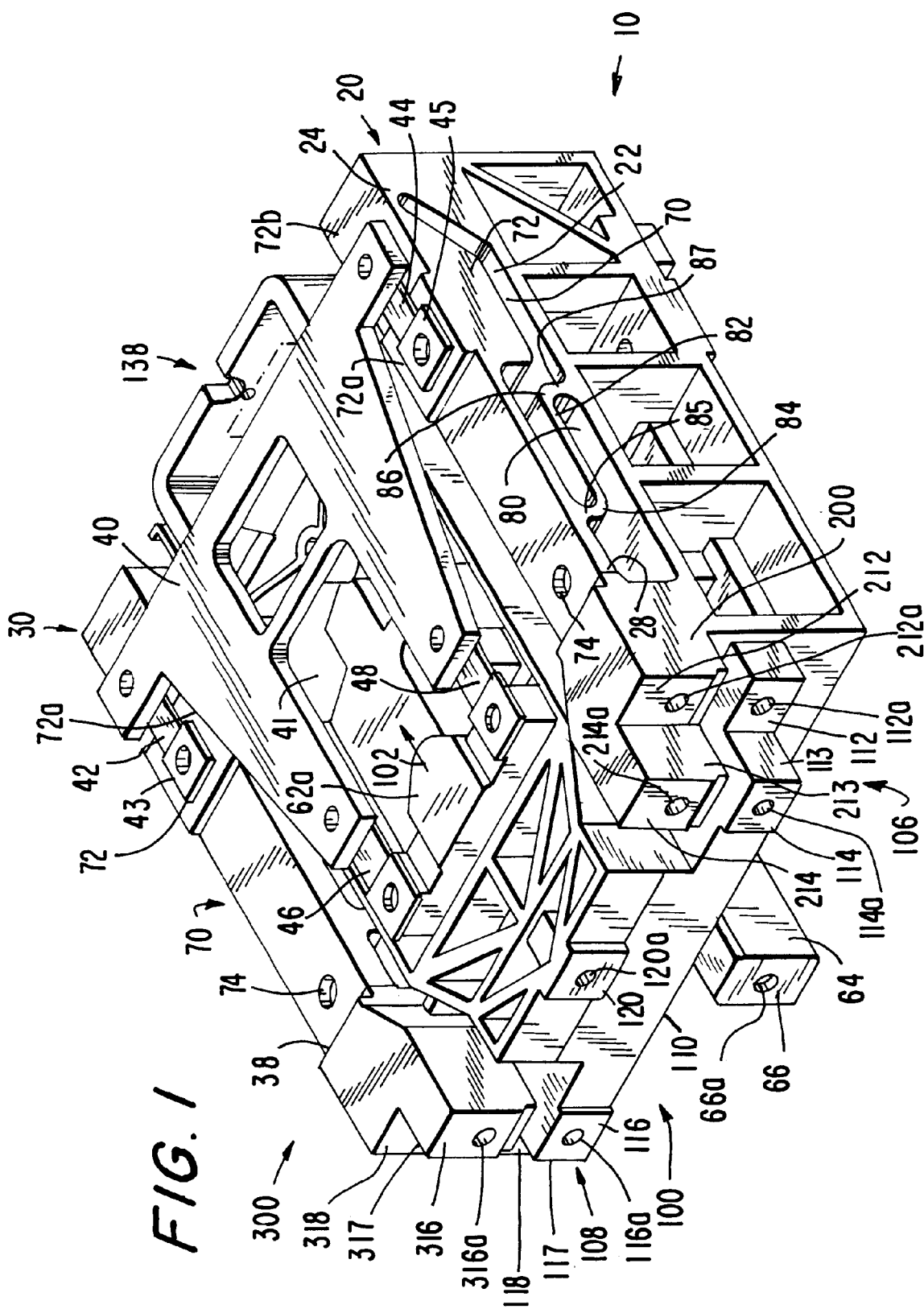
FIG. 1 represents a perspective view of a weighing cell according to the invention.

The weighing cell shown in the drawing consists essentially of a stationary part referenced in its entirety as 10, an upper guide member 40, a lower guide member 50 (see FIG. 2 and 3) extending in a parallel plane relative to the plane of the upper guide member 40, and a load receiver 60 that is constrained to a mode of parallel motion by the guide members 40 and 50.

The stationary part comprises two lateral parts 20 and 30 that are approximately perpendicular to the planes of the guide members 40 and 50 and are joined together by rigid transverse connectors. The lateral parts 20 and 30 together with the rigid, plate-shaped guide members 40 and 50 enclose an essentially square interior compartment of the weighing cell in which the load receiver 60 and a lever for transmitting the load from the load receiver to a measuring transducer are accommodated. The lever as a whole is referenced as 100.

The lever 100 extends from its frontal end surface 110 in a lengthwise direction (as indicated by the arrow 102 in FIGS. 1 and 4) parallel to the guide members 40, 50 and the lateral parts 20, 30 to its rearward end 130 which forms the output area. At the rearward end 130, the lever 100 carries a magnet coil 136 that is immersed in the magnetic field of a permanent magnet assembly 138. The permanent magnet assembly 138 is immovably attached to the stationary part 10. The coil 136 and the permanent magnet assembly 138 together form an electromagnetic force-compensation system with the function of counteracting and compensating the displacement of the lever 100 that occurs as a result of a force being applied to the load receiver 60. The current that needs to be supplied to the compensation coil 136 in order to balance the lever represents a measure for the force that is acting on the load receiver 60. Thus, the current forms an electrical measuring signal that corresponds to the magnitude of the force to be measured and can be subjected to a process of electronic signal conversion.

Figure 4:
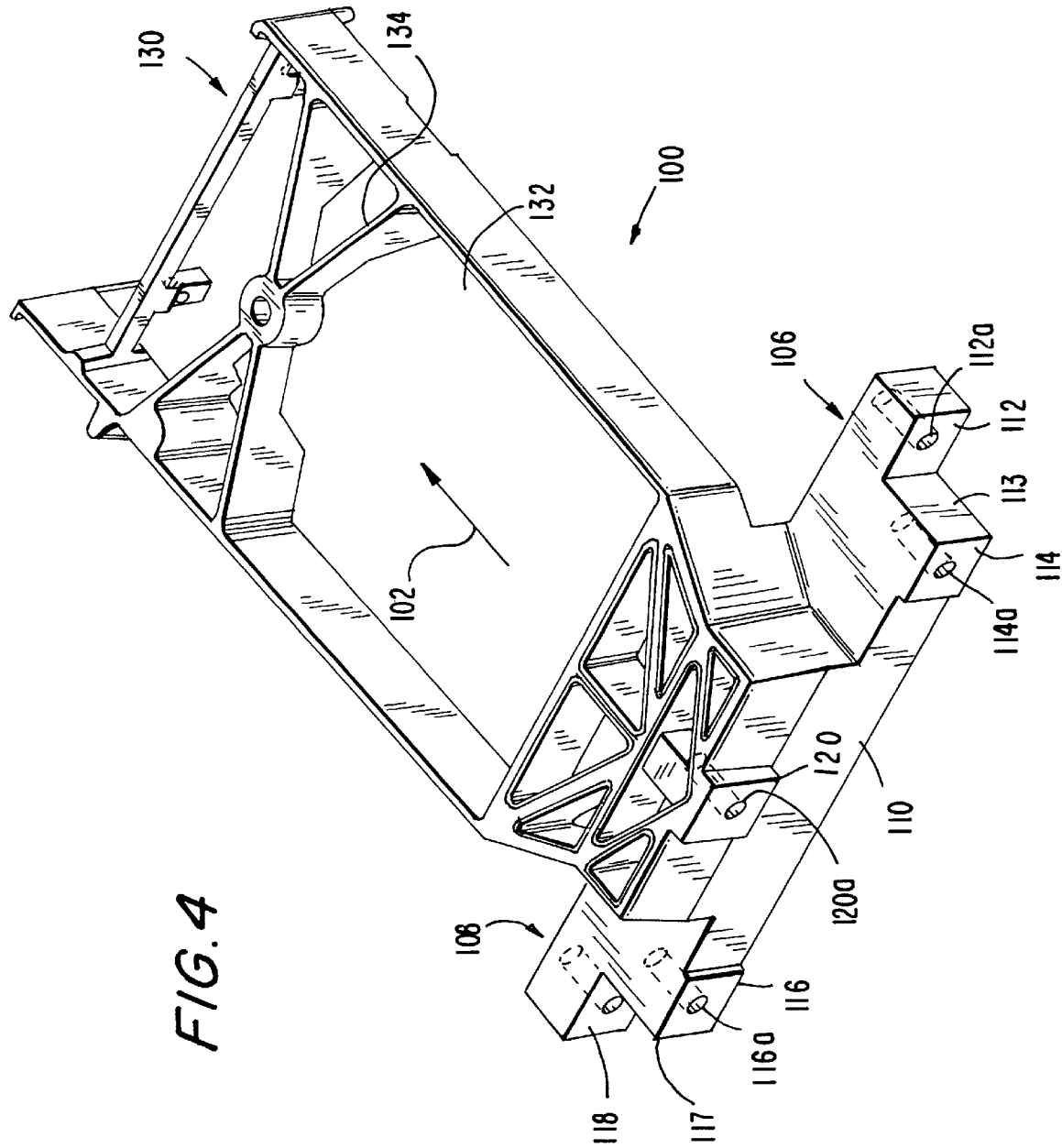
FIG. 4 represents a perspective view of a lever of the weighing cell illustrated in the FIGS. 1 to 3.

As shown with particular clarity in FIG. 4, the lever 100 has within its frontal end surface 110 two projections 106 and 108 extending in opposite directions perpendicular to the lengthwise direction 102 of the lever. The surface of the projection 106 comprises a frontal surface segment 112 perpendicular to the lengthwise direction 102 and traversed by a threaded bore hole 112a. A further frontal surface segment 114 with a threaded bore hole 114a is set off sideways and forward from the frontal surface segment 112, separated by a perpendicular step surface 113. The projection 108 carries in an analogous arrangement the frontal surface segments 118, 116 with the threaded bore holes 118a, 116a and the perpendicular step surface 117. The frontal surface segment 118 is coplanar with the frontal surface segment 112, and 116 is coplanar with 114.

The outer frontal surface segments 112 and 118 together form a first attachment area for coupling the lever 100 to the stationary part 10. Likewise, the inner frontal surface segments 114 and 116 together form a second attachment area for coupling the lever 100 to the stationary part 10.

Finally, the frontal end surface 110 of the lever 100 also comprises a third attachment area 120 with a bore hole 120a for connecting the lever 100 to the load receiver 60. The third attachment area 120 lies in a parallel plane set off towards the front from the planes of the first and second attachment areas. Thus, the lever 100 shown in the drawing has three attachment areas that are set off from each other in the lengthwise direction 102 of the lever 100. The first and second attachment areas formed by the segment pairs 112, 118 and 114, 116, respectively, serve for the connection of the lever 100 to the stationary part 10 by means of a connector element, e.g., in the form of a pair of pivotal flexures. The attachment area 120 serves for the connection between the lever and the load receiver by means of a connector element which, likewise, is preferably configured in the form of a flexure.

To attach the other ends of the respective flexures, the stationary part has frontal surface segments 212, 214, 316, 318 (with bore holes 212a, 214a, 316a, 318a) that correspond, respectively, to the frontal surface segments 112, 114, 116, 118 of the lever. The respectively corresponding surface segments are located on projections 200 and 300 of the lateral parts 20 and 30, respectively. In the assembled state of the weighing cell, the projections 200 and 300 are situated above the projections 106 and 108 of the lever, so that the frontal surface segments 212, 318 of the projections 200, 300 and the frontal surface segments 112, 118 of the projections 106, 108 all lie in a common plane and, analogously, the frontal surface segments 214, 316 of the projections 200, 300 and the frontal surface segments 114, 116 of the projections 106, 108 lie in another common plane.

The frontal surface segments 212 and 318 together form a coupling surface for a pair of pivotal flexures whose other ends are attached to the frontal surface segments 112 and 118, respectively. Analogously, the frontal surface segments 214 and 316 together form a coupling surface for a pair of pivotal flexures whose other ends are attached to the frontal surface segments 114 and 116, respectively.

This arrangement of the attachment surfaces of the lever 100 and the coupling surfaces of the stationary part 10 provides a choice of two fulcrum axes, distanced from each other in the lengthwise direction 102, where the lever 100 can be pivotally connected to the stationary part 10 while the attachment surface 120 stays in the same place. The pivotal connection can be made by two flexures, one of them connecting the projection 200 of the lateral part 20 to the projection 106 of the lever 100, the other connecting the projection 300 of the lateral part 30 to the projection 108 of the lever 100. For a short lever arm between the attachment area 120 and the fulcrum axis, one of the flexures is attached to the frontal surface segments 214 and 114 of projections 200 and 106, respectively, while the other is attached to the frontal surface segments 316 and 116 of projections 300 and 108, respectively. For a longer lever arm, one of the flexures is attached to the frontal surface segments 212 and 112 of projections 200 and 106, respectively, while the other is attached to the frontal surface segments 318 and 118 of projections 300 and 108, respectively.

In the embodiment shown in the drawing, the pairs of frontal surface areas that can be connected by a fulcrum flexure, i.e., 212–112, 214–114, 316–116, 318–118 as well as their bore holes, are designed and arranged so that a single uniform type of flexure can be used in all locations.

By using a pivotal connector element in the form of two fulcrum flexures spaced at a distance from each other, the lever 100 is effectively secured against any rotational displacement in relation to the stationary part 10 about an axis in the lengthwise direction 102.

Figure 3:
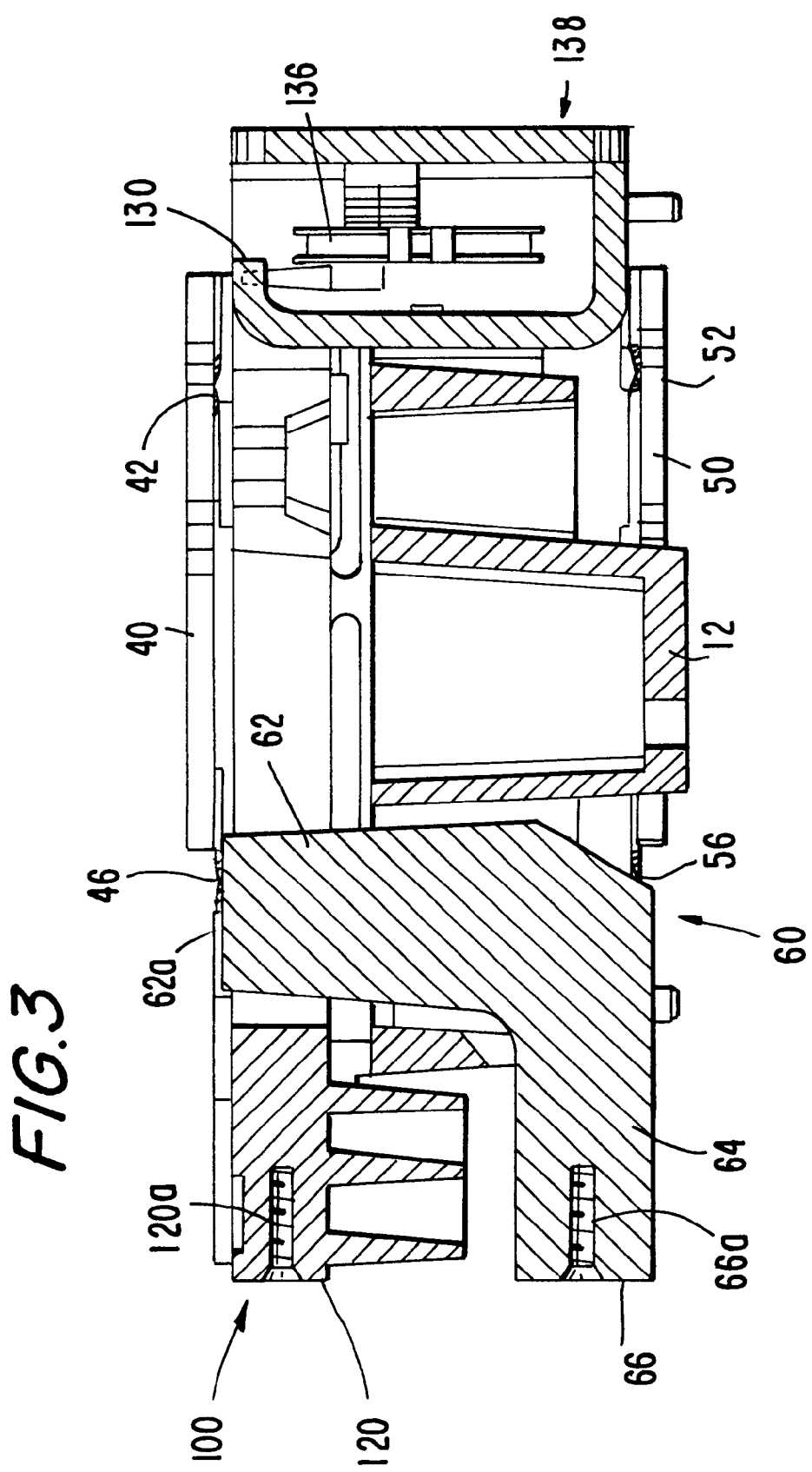
FIG. 3 represents a cross-sectional view of the weighing cell of FIG. 1.

As shown with particular clarity in FIG. 3, the load receiver 60 has an essentially L-shaped cross-section, as seen in a sectional plane that is perpendicular to the fulcrum axis of the lever 100. A vertical portion 62 of the L is arranged in an opening 132 of the lever between the frontal end surface 110 and the lever output area 130 (see FIG. 4). An upper end surface 62a of the vertical portion 62 serves to attach the upper guide member 40, while a bottom end surface serves to attach the lower guide member 50.

A horizontal arm 64 of the load receiver 60 extends below the lever 100 from the lower end of the vertical portion 62 in the direction towards the front-end surface 110 of the lever. The horizontal arm 64 is delimited by a front surface 66 that is aligned flush with the plane of the attachment area 120 of the lever 100 and contains a bore hole 66a. The front surface 66 forms a coupling area for a coupling element, e.g., a flexure, whose other end is fastened to the attachment area 120. The coupling element serves to transmit a vertical displacement motion of the load receiver 62 to the lever 100.

Figure 2:
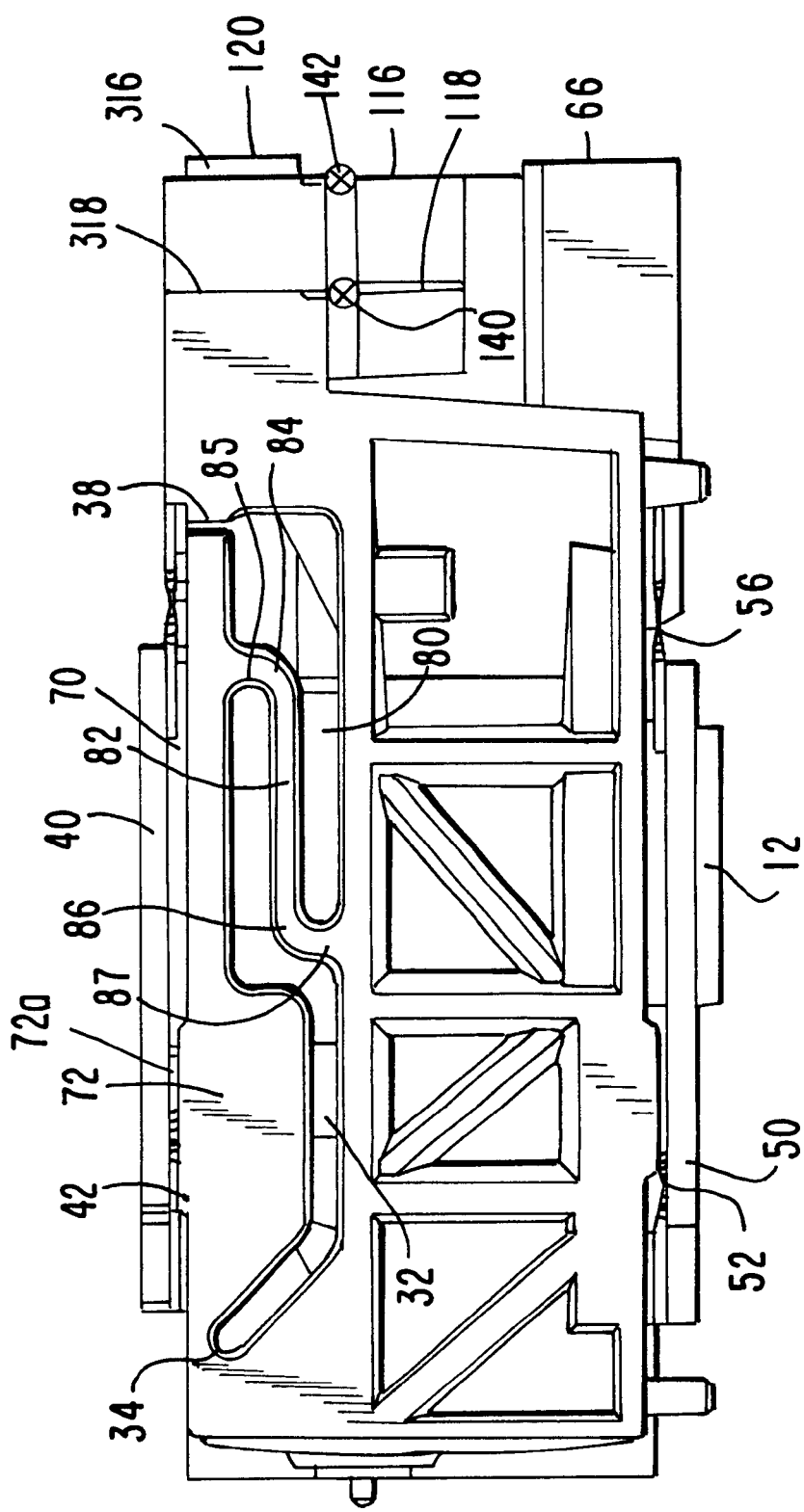
FIG. 2 represents a side view of the weighing cell of FIG. 1 as seen in the direction indicated by the arrow A of FIG. 1.

As illustrated with particular clarity in FIG. 1, the front surface 66 containing bore hole 66a is aligned vertically below and coplanar with the attachment area 120 containing bore hole 120a of the lever 100. This arrangement permits the force introduction from the load receiver 60 into the lever 100 to be almost perfectly aligned with the displacement path of the load receiver 60 which runs perpendicular to the planes of the guide members 40 and 50. As can be seen further in FIG. 1, the common plane of attachment area 120 and coupling area 66 is parallel to the two possible fulcrum axes that are indicated in FIG. 2 by the crosses 140 and 142. Also, the attachment area 120 and the coupling area 66 are located between the projections 200 and 300 of the lateral parts 20 and 30 as well as between the projections 106 and 108 of the lever 100. All of the attachment areas of the lever 100 as well as the coupling areas of the stationary part 10 and the load receiver 60 are arranged mirror-symmetrically in relation to a plane that runs perpendicular to the possible fulcrum axes 140 and 142. The mirror-symmetry of the coupling areas and attachment areas assures that the forces transmitted through the connector elements are not introducing any torsional moments into the lever in relation to its lengthwise axis.

To change the measuring range of the weighing cell shown in the drawing, one only has to change the fulcrum flexures from one fulcrum axis location to the other, i.e., remove them from a current position and reattach them in the other of the two possible positions. This process is made easy due to the fact that all attachment and coupling areas are accessibly mounted on the frontal surface of the weighing cell on the opposite side from the electromagnetic force-compensation system, further due to the fact that they occupy parallel positions in a common plane, and that the attachment and coupling areas are configured so that a single, uniform type of fulcrum flexures can be used in all locations.

It will now be described how the guide members 40 and 50 are connected to the weighing cell illustrated in the drawing. To couple the upper guide member 40 to the stationary part 10 so that the position of the upper guide member 40 is adjustable in relation to the lower guide member 50, the lateral parts 20 and 30 contain slits 22 and 32, respectively, starting at the narrow material connections 24, 34 and extending towards the projections 200 and 300. The slits 22 and 32 run out into material-free spaces 28 and 38 at the top of the lateral parts 20 and 30 where the material-free spaces 28 and 38 extend approximately perpendicular to the planes of the guide members 40 and 50. The slits 22 and 32 delimit in each of the lateral parts 20 and 30 an arm 70, the latter beginning at the narrow material connections 24, 34 and running approximately parallel to the guide members 40, 50 in the direction towards the projections 200, 300. Each of these arms 70 has an attachment area 72 for fastening the upper guide member 40 to the stationary part 10 and an adjustment area in the form of a hole 74 for an adjustment screw (not shown) that is perpendicular to the planes of the guide members 40, 50. Each attachment area 72 is located on its respective arm between the narrow material connections 24 or 34 and the hole 74 and arranged so that the distance A from the hole 74 to the attachment area 72 is greater than the distance B from the attachment area 72 to the narrow material connection 24 or 34 (see FIG. 2).

The top surface 72a of the attachment area 72 is slightly raised in comparison to the rest of the upper surface of the arm 70. Attached to the raised surface areas 72a are the fastening lugs 43, 45 of the pivotal flexures 42, 44 that extend from the back end of the upper guide member 40 in the direction towards the load receiver 60. Through the pivotal flexures 42, 44, the upper guide member 40 is flexibly coupled to the attachment areas 72 and thus also to the lateral parts 20 and 30 of the stationary part 10.

At its opposite end, the upper guide member 40 is coupled to the top surface 62a of the vertical portion 62 of the load receiver 60 through the pivotal flexures 46 and 48. The lower guide member 50, formed as a rigid plate like the upper guide member 40, is coupled in like manner to the lateral parts 20 and 30 and to the load receiver 60 through flexures that are the analogous counterparts of the flexures 42, 44 and 46, 48, respectively. Shown in FIGS. 2 and 3 at respectively opposite locations from the flexures 42 and 46 are the flexures 52 and 56 by which the lower guide member is attached at one end to the lateral part 30 and at the other end to the load receiver 60.

The arms 70 can be tilted about an axis defined by the pivotal flexures that are formed by the narrow material connections 24 and 34 by turning one of the adjustment screws that are inserted in the holes 74. By tilting an arm 70, the attachment surface 72a of the attachment area 72 (and thus also the attached fastening lug 43 or 45 of the flexure 42 or 44, respectively, of the upper guide member 40) is raised or lowered approximately perpendicular to the planes of the guide members. This adjustment process allows the upper guide member 40 to be aligned precisely parallel to the lower guide member 50. Each of the arms functions as a one-armed lever in that the displacement effected by the adjustment screw at the hole 74 is leveraged down by a factor of more than two at the respective attachment area 72. Thus, each of the attachment areas 72 can be precisely adjusted up or down with simple adjustment screws running through the respective holes 74.

In this arrangement, an undesirable distortion of the arms 70 at the attachment areas 72 is prevented on the one hand by a greater material thickness of the attachment areas 72 and on the other hand by stabilizer elements 80 contained in the slits 22 and 32. Each of the stabilizer elements 80 is formed in a monolithic unit, together with the arm and the main body of the respective lateral part 20 or 30, as a connecting portion between the underside of the arm 70 and an upward facing surface of the lateral part 20 or 30. The connecting portions that form the stabilizer elements 80 have an approximately S-shaped cross-section, viewed in the direction of the pivotal axis that is defined by the narrow material connections 24 and 34. From the respective arm 70, the connecting portion 80 starts with a first short segment 85 perpendicular to the guide members 40, 50, continues around a first bend 84 into a longer segment 82 parallel to the guide members, then turns around a second bend 86 into a second short segment 87 that connects to the main body of the respective lateral part 20 or 30. In the direction of the pivotal axis defined by the narrow material connections 24, 34, the connecting portions 80 have the same width as the arms 70, while their other cross-sectional dimension is significantly smaller. In relation to the lengthwise direction of the arms 70, the connecting portions 80 are arranged between the holes 74 and the attachment areas 72. Seen in a plane that is perpendicular to the aforementioned pivotal axis, the connecting portions 80 are located between the upper guide member 40 and the lower guide member 50.

The configuration of the connecting portions 80 as described above and illustrated in the drawing provides on the one hand an elastically flexible support for the arms 70 in the vertical direction relative to the planes of the guide members 40 and 50, and on the other hand it increases the rigidity of the arms 70 in the horizontal direction. In addition, the connecting portions 80 help to prevent torsional deformation of the arms 70 in relation to their longitudinal axes.

As can be seen most clearly in FIG. 3, the stationary part 10 also comprises a central support 12 in addition to the lateral parts 20 and 30. The central support 12 traverses the lower guide member 50 through a window that corresponds to the window 41 in the upper guide member 40 (see FIG. 1). The central support 12 serves to mount the illustrated weighing cell in the chassis frame of a balance.

The invention is not limited to the specific embodiment as described and illustrated. The scope of the invention is also intended to cover an embodiment where the load receiver, too, has a plurality of coupling areas that are distanced from each other in the longitudinal direction of the lever, and where the lever has analogously arranged attachment areas associated with the respective coupling areas of the load receiver. Further, the lever can have more than two fulcrum-flexure attachment areas spaced at a distance from each other in the lengthwise direction of the lever, with an analogous arrangement of associated coupling areas being provided on the stationary part. Further within the inventive concept is a configuration where the arm of the load receiver with the coupling area extends in a space above the lever. In this configuration, too, the load receiver can have a plurality of coupling surfaces for a connector element to the lever. Further yet, in the place of one lever for transmitting the force from the load receiver to a measuring transducer, it is possible to use a system of two or more levers where at least one of the levers has at least three attachment areas for a connector element that are spaced at a distance from each other in the lengthwise direction of the lever.

What is claimed is:

1. A force-measuring apparatus, particularly a weighing cell, with a stationary part, a load receiver that serves to receive a force to be measured, and a lever combined in an arrangement where the load receiver is coupled to the stationary part independent of the lever so that, in response to the force, the load receiver is movable in relation to the stationary part without being guided by the lever;

the lever is connected to the load receiver through a first connector element and to the stationary part through a second connector element, the load receiver and the stationary part each having coupling areas for fastening the first and second connector elements, the second connector element is distanced from the first connector element in a lengthwise direction of the lever in an arrangement that allows a lever ratio to be changed;

the second connector element forms a fulcrum axis for a rotation of the lever as the latter transmits a displacement of the load receiver to a lever output area located at a distance from the first and second connector elements in the lengthwise direction of the lever, comprising the improvement that the lever has at least three attachment areas for fastening one of the first and second connector elements, that the attachment areas are located at a distance from each other in the lengthwise direction of the lever, and that the coupling areas of the load receiver and the stationary part are arranged vertically above or below the attachment areas in a common plane with the attachment areas, respectively.

2. The force-measuring apparatus according to claim 1, wherein at least two attachment areas are located at a distance from each other in the transverse direction of the lever.

3. The force-measuring apparatus according to claim 1, wherein at least one of the attachment areas for the second connector element has at least two attachment area segments spaced at a distance from each other along the fulcrum axis.

4. The force-measuring apparatus according to claim 1, wherein at least one attachment area comprises an attachment surface approximately perpendicular to the longitudinal axis of the lever and located at a frontal end surface of the lever at an opposite end from the lever output area.

5. The force-measuring apparatus according to claim 1, wherein the load receiver and the stationary part in total have at least three coupling areas for fastening one of the connector elements and wherein further, in relation to the lengthwise direction of the lever, the coupling areas are located at a distance from each other at analogous positions to the attachment areas on the lever.

6. The force-measuring apparatus according to claim 1, wherein at least two coupling areas are located at a distance from each other in a direction parallel to the fulcrum axis of the lever.

7. The force-measuring apparatus according to claim 1, wherein at least one coupling area of the stationary part has at least two coupling area segments spaced at a distance from each other along the fulcrum axis.

8. The force-measuring apparatus according to claim 1, wherein at least one coupling area of the stationary part has a coupling surface perpendicular to the lengthwise direction of the lever and facing away from the lever output area.

9. The force-measuring apparatus according to claim 1, wherein at least one coupling area of the stationary part is in coplanar alignment with an attachment area of the lever.

10. The force-measuring apparatus according to claim 1, wherein at least one of the attachment areas and coupling areas comprises at least one threaded hole for fastening a connector element with one or more screws.

11. The force-measuring apparatus according to claim 1, wherein the attachment and coupling areas have a mirror-symmetric arrangement in relation to a plane that is perpendicular to the fulcrum axis.

12. The force-measuring apparatus according to claim 1, wherein in the lengthwise direction of the lever the load receiver is arranged between the attachment areas and the lever output area.

13. The force-measuring apparatus according to claim 1, wherein the load receiver comprises a cantilevered portion extending parallel to the lengthwise direction of the lever and carrying the coupling area for fastening a first connector element connecting the load receiver to the lever.

14. The force-measuring apparatus according to claim 1, wherein the stationary part comprises two lateral parts extending in planes essentially perpendicular to the fulcrum axis and wherein further the lever is arranged in a space between the two lateral parts.

15. The force-measuring apparatus according to claim 14, wherein each lateral part comprises at least one coupling area segment of one of the coupling areas.

16. The force-measuring apparatus according to claim 15, wherein the coupling area segments are arranged on end surfaces of the lateral parts that face away from the output area of the lever.

17. The force-measuring apparatus according to claim 14, wherein the lever has at least one projection extending parallel to the fulcrum axis in the direction towards one of the lateral parts and wherein further the projection comprises at least one attachment area segment of one of the attachment areas.

18. The force-measuring apparatus according to claim 17, wherein at least one attachment area segment is coplanar and in a parallel orientation with a corresponding coupling area segment of one of the lateral parts.

19. The force-measuring apparatus according to claim 17, wherein an attachment area of the lever is arranged between the planes of the lateral parts.

20. The force-measuring apparatus according to claim 19, wherein a coupling area of the load receiver is coplanar and in a parallel orientation with the attachment area of the lever.

21. The force-measuring apparatus according to claim 1, further comprising an electromagnetic compensation coil that is attached to the output area of the lever and immersed in a magnet assembly of an electromagnetic force compensation system that is attached to the stationary part.

22. The force-measuring apparatus according to claim 1, further comprising two parallel guide members for guiding the load receiver in a mode of parallel motion in relation to the stationary part, the guide members being stiff in a longitudinal direction but flexible in a transverse direction, and each of the two parallel guide members being attached at one end to the load receiver and at an opposite end to the stationary part.

23. The force-measuring apparatus according to claim 22, wherein the lengthwise direction of the lever is parallel to the guide members and the lever extends in a space between the guide members.

24. The force-measuring apparatus according to claim 21, further comprising an adjusting device by which at least one attachment terminal where one of the guide members is mounted to the stationary part can be positionally adjusted in a direction transverse to a plane defined by the guide member.

25. The force-measuring apparatus according to claim 24, wherein the attachment terminal is located on an arm that is parallel to the guide members and pivotally connected to the stationary part so that the arm can tilt up and down in relation to the stationary part, wherein further the arm comprises a position-adjuster element engaged in an adjustment area of the arm and serving to adjust a tilt-angle of the arm and, in addition, the distance from the adjustment area to the attachment terminal is at least exactly as long as the distance from the attachment terminal to a place where the arm is pivotally connected to the stationary part.

26. The force-measuring apparatus according to claim 25, wherein the pivotal connection between the arm and the stationary part has the shape of a narrow and flexible material portion by which the arm is monolithically connected to the stationary part.

27. The force-measuring apparatus according to claim 25, further comprising a stabilizer element that is connected at one end to the arm and at an opposite end to the stationary part so as to stiffen the arm against moving sideways in parallel with the planes of the guide members while allowing an elastically flexible tilting movement of the arm transverse to the planes.

28. The force-measuring apparatus according to claim 27, wherein the stabilizer element comprises at least one S-shaped connector portion in a plane defined by the tilting movement of the arm.

29. The force-measuring apparatus according to claim 27, wherein the stabilizer element is formed in a monolithic unit together with the arm and the body of the stationary part.

* * * * *